(12) United States Patent
Assuid

(10) Patent No.: US 9,550,882 B2
(45) Date of Patent: Jan. 24, 2017

(54) FORMULATION FOR A BLADE ELEMENT OF A WINDSCREEN WIPER BLADE

(71) Applicant: Valeo Systèmes d'Essuyage, Le Mesnil Saint Denis (FR)

(72) Inventor: Patrick Assuid, Veyre Monton (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 14/809,465

(22) Filed: Jul. 27, 2015

(65) Prior Publication Data

US 2016/0024274 A1   Jan. 28, 2016

(30) Foreign Application Priority Data

Jul. 28, 2014   (FR) ...................................... 14 57281

(51) Int. Cl.
| | |
|---|---|
| *C08K 5/11* | (2006.01) |
| *B29C 35/02* | (2006.01) |
| *B60S 1/38* | (2006.01) |
| *C08K 5/00* | (2006.01) |
| *B29K 105/00* | (2006.01) |
| *B29L 31/30* | (2006.01) |

(52) U.S. Cl.
CPC .................. *C08K 5/11* (2013.01); *B29C 35/02* (2013.01); *B60S 1/38* (2013.01); *C08K 5/0016* (2013.01); *B29K 2011/00* (2013.01); *B29K 2105/0038* (2013.01); *B29L 2031/305* (2013.01); *B60S 2001/3829* (2013.01); *C08K 2201/014* (2013.01)

(58) Field of Classification Search
CPC ...... C08K 5/11; B60S 1/38; B60S 2001/3829; B29C 35/02; B29L 2031/305
USPC ........................................................ 524/311
See application file for complete search history.

(56) References Cited

FOREIGN PATENT DOCUMENTS

JP         2009197121 A   *   9/2009

OTHER PUBLICATIONS

Abstract of JP 2009-197121, Sep. 3, 2009.*

* cited by examiner

*Primary Examiner* — Hui Chin
(74) *Attorney, Agent, or Firm* — Osha Liang LLP

(57) ABSTRACT

A formulation for the preparation of a wiping blade element for a vehicle windscreen wiper blade is disclosed. The formulation has an elastomer material based on chloroprene rubber in which plasticizing additives are incorporated, where the plasticizing additives include a combination of at least a first additive, the pour point of which is less than $-50°$ C., and at least a second additive, the pour point of which is greater than $-50°$ C. The first additive is octyl sebacate in a proportion of 4 phr and the second is a naphthalic oil plasticizer or a $C_{18}$-$C_{30}$ tricarboxylic ester in a proportion of 10 phr.

15 Claims, No Drawings

FORMULATION FOR A BLADE ELEMENT OF A WINDSCREEN WIPER BLADE

The field of the present invention is that of parts for vehicles and more particularly that of parts for the wiping of the windscreen of motor vehicles.

Motor vehicles are commonly equipped with windscreen wiper systems for washing the windscreen and preventing the sight which the driver has of his surroundings from being disturbed. These windscreen wipers are conventionally driven by an arm which makes an angular to-and-fro movement and they comprise elongated blades, themselves carrying wiping blade elements made of an elastic material. These wiping blade elements generally have a triangular shape which gets thinner towards the bottom, the lower tip of which moves over the windscreen and the upper side of which is attached by a thin elastic strip to the body of the blade. This thin strip makes it possible, by bending, for the wiping blade element to lean towards the windscreen, in one direction and then the other, during the to-and-fro movements of the blade.

These blade elements rub against the windscreen and evacuate the water by bringing it outside the field of vision of the driver. The wear created by this toing and froing reduces the longevity of these blade elements and the rubbing of the wiping blade element against the windscreen, particularly when the latter is not very wet, can generate noise pollution. It is thus important to find an appropriate formulation for the elastomer material which makes up these blade elements in order, on the one hand, to increase this lifetime as much as can be done and, on the other hand, to prevent noise pollution.

The wiping blade elements are generally made of an elastomer material which results from the range of the rubbers and which has been vulcanized. One type of rubber sometimes employed for windscreen wiper blades is chloroprene rubber, normally called CR rubber, and best known under its commercial name of neoprene. The elastomer material is prepared, before its vulcanization, in the form of a mixture of CR rubber and of various ingredients which modify the mechanical properties which it will have after the vulcanization. Zinc oxide ZnO, which is the vulcanizing agent for this type of rubber, and a vulcanization accelerator, in order to accelerate this process, are found in particular. Various additives are also incorporated, such as carbon black, for increasing its resistance to abrasion, plasticizing agents and/or fatty substances, for rendering it more malleable during its manufacture and of better resistance to low temperatures, antioxidants or also products for adjusting the acidity or for masking certain odours. The fatty substances, also known as lubricating fillers, introduced into the formulation are used in particular to reduce the coefficient of friction of the blade element over the windscreen.

The preparation of a blade element, starting from the mixture produced, is obtained by a shaping operation, either by compression in a mould or by extrusion through a die, before the vulcanization starts.

The noise generated by the rubbing of the blade elements over the windscreen, which is of often random occurrence and which generally appears in a frequency range from 600 to 1000 Hz, has to be controlled. For this, it is known to add various plasticizing products, such as, for example, oils resulting from petrochemistry. Their role is to improve the damping of the high frequency vibrations of the windscreen wiper blade, by limiting the elastic characteristic of this material and by correspondingly increasing its viscous component.

The quantification of this damping characteristic is carried out on a viscoelasticity dynamic mechanical analyser (DMA), which measures the phase angle $\delta$ existing between the stress applied to the viscoelastic material as forced vibrations, in the form of a sinusoidal oscillation, and the sinusoidal strain of the same frequency which results therefrom. The quantity representative of the viscoelasticity of the elastomer is expressed in the form of the tangent of this angle $\delta$. The greater this angle, the better the level of damping and thus the lower the risk of transitory noises.

This quantification is carried out at lower frequencies (a few hertz or tens of hertz) than the frequencies which it is desired to control, so that the effects of the oscillations of the applied stress are observable. It is then known to find the impact of these stresses at high frequencies using a relationship between the frequency and temperature to which the elastomer is subjected during the test and the operating frequency and temperature. Thus, an experiment carried out at $-20°$ C. under 1 Hz gives the same results as if the experiment were carried out at ambient temperature and at a frequency of 600 Hz.

From the viewpoint of the rubbers envisaged, chloroprene rubber CR, which is sometimes employed for the preparation of a wiping blade element, already exhibits a good level of damping, in comparison with the other rubbers which can be envisaged (such as natural rubber NR or special elastomers of EPDM or ethylene/propylene/diene monomer type). Nevertheless, it is desirable to improve this damping characteristic by appropriately choosing plasticizers to be incorporated in the mixture before it is vulcanized. This is because the molecular mobility of the products added has a direct impact on the tangent $\delta$ of the elastomer.

To this end, a subject-matter of the invention is a formulation for the preparation of a wiping blade element for a vehicle windscreen wiper blade, the said formulation comprising an elastomer material based on chloroprene rubber in which plasticizing additives are incorporated, characterized in that the said plasticizing additives comprise a combination of at least a first additive, the pour point of which is less than $-50°$ C., and at least a second additive, the pour point of which is greater than $-50°$ C.

"Formulation" is understood to mean a chemical composition.

"Preparation" is understood to mean the manufacture of the wiping blade element.

This twofold addition makes it possible to improve the viscoelastic damping of the elastomer without damaging its low-temperature elasticity.

Preferably, the pour point of the said first additive is greater than or equal to $-60°$ C.

In a specific embodiment, the said first additive comprises an ester and more preferably a $C_{18}$-$C_{30}$ dicarboxylic ester, for example octyl sebacate.

Preferably, the pour point of said second additive is less than or equal to $-30°$ C.

More preferably, the pour point of the said second additive is between $-46°$ C. and $-30°$ C., preferably between $-40°$ C. and $-30°$ C. and more preferably substantially equal to $-30°$ C.

In a specific embodiment, the said second additive is a naphthalic oil plasticizer or a $C_{18}$-$C_{30}$ tricarboxylic ester.

Advantageously, the amount of the first additive is between 3 and 5 phr (parts per hundred parts of rubber, by weight) and more advantageously it is 4 phr.

Preferably, the ratio by weight of the first additive to the second additive is between 2 and 3 and more preferably is substantially equal to 2.5.

The invention also relates to a wiping blade element for a vehicle windscreen wiper blade prepared from a formulation as described above and to a vehicle windscreen wiper blade comprising such a wiping blade element.

Finally, it relates to a process for the manufacture of a wiping blade element for a vehicle windscreen wiper blade by vulcanization of a formulation as described above.

According to one embodiment of the invention, the above process comprises a stage of moulding the wiping blade element.

A better understanding of the invention will be obtained and other aims, details, characteristics and advantages of the invention will become more clearly apparent during the detailed explanatory description which will follow of an embodiment of the invention given as purely illustrative and nonlimiting example.

In order to increase the value of the tangent δ of the mixture, the Applicant Company provides for the addition of a plasticizer having a high pour point which is of the order of −50 to −30° C. and in any case greater than −50° C. The pour point of a viscoelastic material corresponds to the temperature from which it begins to leave the solid phase and to flow. The plasticizer added can be a product such as those known under the trade name Nyflex 230P or TOTM, the pour points of which are respectively −30° C. and −46° C., or more generally a product of the naphthalic oil plasticizer type or else a tricarboxylic ester in the range from $C_{18}$ to $C_{30}$. The addition of this plasticizer increases the tangent δ at −20° C. and consequently the viscoelastic damping of the elastomer in the frequency range of 600 to 1000 Hz.

On the other hand, this addition exhibits the disadvantage of damaging the properties of resistance to cold of the rubber. The Applicant Company consequently provides for the addition to the elastomer mixture of a second plasticizer having a low pour point. This second plasticizer is of the ester type and makes it possible, as a result of its high molecular mobility, to improve the low-temperature elasticity of the material. The pour point recommended by the invention is set as being less than −50° C. By way of example, it is possible to choose an ester of the octyl sebacate (or DOS) type, the pour point of which is −55° C., or more generally a dicarboxylic ester in the $C_{18}$ to $C_{30}$ range.

The recommended contents for the two plasticizers are 4 phr for the plasticizer having a low pour point and 10 phr for the plasticizer having a high pour point. Tests have shown that the addition of a plasticizer having a high pour point at a concentration of 10 phr, in combination with a reduction to 4 phr in that having a low pour point, provides an improvement in the tangent δ at −20° C. of 0.2 or even 0.3 point, for both products mentioned above, with respect to a formulation which comprises only the single plasticizer having a low pour point. Furthermore, it is found that the greatest gain (0.3 versus 0.2 point) is contributed by the plasticizer which has the highest pour point (−30° C. versus −46° C., in the case in point, in both experimental formulations).

The value of tangent δ obtained at −20° C. with these additives thus reaches values, respectively, of 0.7 and 0.8 (versus 0.4 and 0.6 respectively without additive having a high pour point) during an experiment in forced vibrations of 30 microns in amplitude under a frequency of 1 Hz. These values guarantee an absence of vexatious noise for a wiping blade element in use on a windscreen.

The invention claimed is:

1. A formulation for the preparation of a wiping blade element for a vehicle windscreen wiper blade, the formulation comprising:
   an elastomer material based on chloroprene rubber in which plasticizing additives are incorporated, wherein the plasticizing additives comprise a combination of at least a first additive, the pour point of which is less than −50° C., and at least a second additive, the pour point of which is greater than −50° C.

2. The formulation according to claim 1, in which the pour point of the first additive is greater than or equal to −60° C.

3. The formulation according to claim 2, in which the first additive comprises a $C_{18}$-$C_{30}$ dicarboxylic ester.

4. The formulation according to claim 1, in which the pour point of the second additive is less than or equal to −30° C.

5. The formulation according to claim 1, in which the pour point of the second additive is one selected from a group consisting of between −40° C. and −30° C.

6. The formulation according to claim 5, in which the second additive is a naphthalic oil plasticizer or a $C_{18}$-$C_{30}$ tricarboxylic ester.

7. The formulation according to claim 1, in which the amount of the first additive is between 3 and 5 phr (parts by hundred parts of rubber, by weight).

8. The formulation according to claim 7, in which the amount is 4 phr (pans by hundred parts of rubber, by weight).

9. The formulation for the preparation of a wiping blade element according to claim 1, in which the ratio by weight of the first additive to the second additive is between 2 and 3.

10. The formulation according to claim 9, in which the ratio is equal to 15.

11. A wiping blade element for a vehicle windscreen wiper blade prepared from a formulation according to claim 1.

12. A vehicle windscreen wiper blade comprising a wiping blade element according to claim 11.

13. A process for the manufacture of a wiping blade element for a vehicle windscreen wiper blade by vulcanization of a formulation according to claim 1.

14. The process according to claim 13, comprising a stage of moulding the wiping blade element.

15. The formulation of claim 3, wherein the $C_{18}$-$C_{30}$ dicarboxylic ester is octyl sebacate.

* * * * *

UNITED STATES PATENT AND TRADEMARK OFFICE
CERTIFICATE OF CORRECTION

PATENT NO. : 9,550,882 B2  
APPLICATION NO. : 14/809465  
DATED : January 24, 2017  
INVENTOR(S) : Patrick Assuid Page 1 of 1

It is certified that error appears in the above-identified patent and that said Letters Patent is hereby corrected as shown below:

In the Claims

Column 4, Claim 10, Line 44, the number "15" should read -- 2.5 --.

Signed and Sealed this
Twenty-fifth Day of April, 2017

Michelle K. Lee
*Director of the United States Patent and Trademark Office*